United States Patent Office 3,518,148
Patented June 30, 1970

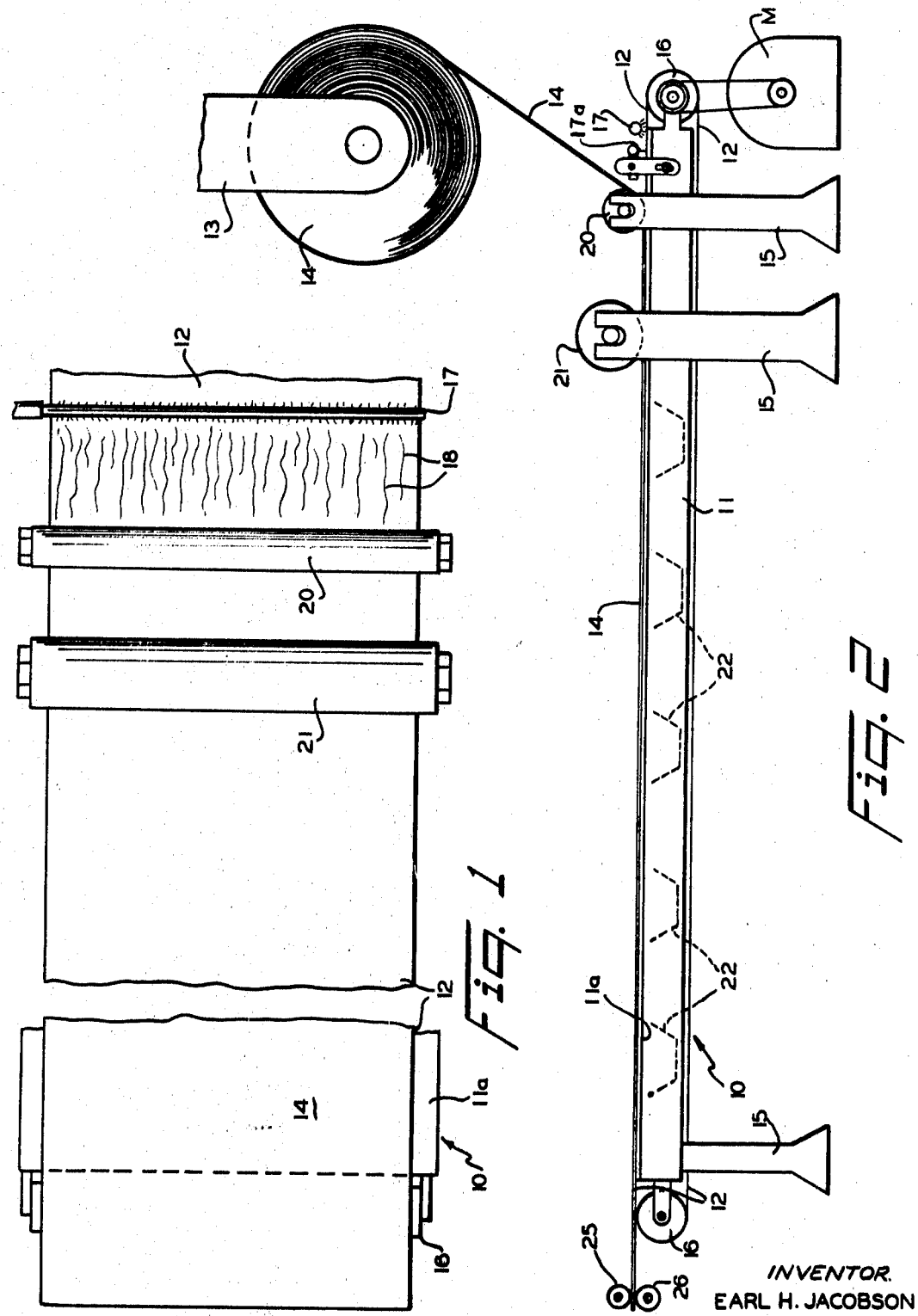

---

3,518,148
APPARATUS FOR BONDING A FLEXIBLE PLASTIC BACKING TO A SYNTHETIC FIBER TEXTILE
Earl H. Jacobson, Cayuga, N.Y., assignor to Auburn Plastics, Inc., Auburn, N.Y., a corporation of New York
Filed Mar. 16, 1967, Ser. No. 623,665
Int. Cl. B29c 3/00
U.S. Cl. 156—380          3 Claims

ABSTRACT OF THE DISCLOSURE

An apparatus for bonding a plastic backing to a textile of synthetic fibers includes a flexible endless translucent belt supported on a translucent table top having radiant heaters thereunder. The method comprises spreading liquid plastic on the belt, pressing the textile on the plastic, and running these on the belt over the heaters. The plastic shields the textile from the heat while the plastic is curing, the textile fibers having a lower breakdown temperature than the curing temperature.

BACKGROUND OF THE INVENTION

This invention relates to a machine and method for bonding a flexible plastic backing material to a synthetic fiber textile material, the curing temperature of the plastic being near to the temperature at which the synthetic fiber breaks down.

The conventional means for bonding a plastic material to a fibrous material is to spread the plastic on the fibrous material and then bond the two together in an oven.

Applicant has found, however, that when a synthetic fiber material is used, such as felted polypropylene fiber, and the curing temperature of the plastic, such as polyvinyl chloride, is very near to and often above the breakdown temperature of the synthetic fiber, it is impossible to control the oven heat to get proper curing without breaking down the fiber.

SUMMARY OF THE INVENTION

The invention contemplates applying radiant heat to cure the plastic while it is in contact with the textile so that the plastic shields the textile from the heat and the textile is exposed to cool air. To this end, a layer of plastic in liquid form is spread on a translucent belt and the textile pressed down thereupon. The belt, plastic and textile are then drawn over a translucent table top having radiant heaters thereunder. The belt is endless and the textile with cured plastic bonded thereto is stripped from the belt at the end of the table.

The principal object of the invention, accordingly is to provide a machine and method for bonding a flexible plastic backing to a synthetic fiber material when the curing temperature of the one is close to the breakdown temperature of the other.

Another important object is to provide a machine onto which a synthetic fiber textile material can be continuously led and brought into contact with plastic backing material, the plastic backing material then being cured while in contact with the textile material.

Another object is to provide a method for applying a flexible plastic backing material to a synthetic fiber textile material in which radiant heat is employed and the fiber material is maintained more remote from the heat source than the plastic backing material during curing.

Other objects and advantages will become apparent from the following description in conjunction with the appended drawing, in which:

BRIEF DESCRIPTION OF THE DRAWINGS

FIG. 1 is a fragmentary plan view of the apparatus for practicing the method of the invention, a portion of the material overlying the belt being omitted for clarity; and FIG. 2 is a diagrammatic side elevational view thereof.

DESCRIPTION OF THE PREFERRED EMBODIMENT

In the drawing, the machine 10 comprises a table 11, an endless belt 12 and means 13 for supporting a supply roll of felt or other textile 14 above the table.

Table 11 is provided with legs 15 and has a non-metal top 11a, at least in part of translucent material, such as "Teflon," on which the top run of belt 12 is supported. At either end of the table conventional rolls 16 are provided for driving the belt 12, the roll 16 at one end being driven by motor M. Belt 12 is made of woven fiberglass impregnated with "Teflon" so as to be impervious.

Forward of the drive roll 16 a pipe 17 or other conduit extends across above the belt 12. Pipe 17 has a plurality of holes in the lower side and leads to a supply tank, not shown, of the plastic backing material 18 in its liquid, uncured form so that the plastic is forced under pressure out of the holes in pipe 17 to be spread over the top of belt 12. Forward of the pipe 17 a knife or doctor blade 17a is supported across the table 11 so as to be adjustable vertically and angularly to assist in spreading the backing material 18 evenly and to the desired depth across the belt 12.

Forward of the blade 17a, a weighted roller 20 is supported at either end across table 11 so as to bear down on the textile material which is led under the roller from the roll of textile material 14. Roller 20 presses the material 14 down on the plastic coating 18 spread on belt 12, the belt being supported by the table top 11a, so that the liquid plastic is spread evenly over the belt and in intimate contact with the fibers of textile material. Forward of roller 20 a second weighted roller 21 may be provided to further press the fiber material against the liquid plastic backing on the belt.

Forward of roller 21, the table is provided with a plurality of radiant heaters, shown at 22, under the translucent portion of the table top 11a.

In operation, as belt 12 moves forward, the textile 14 and the plastic backing material 18 thereunder are drawn forward over the table top 11a, the backing material being radiantly heated for curing the backing by the heaters 22 under the table top.

The particular textile material 14 for which table 10 was designed was a needled felt of polypropylene fibers and the backing used was polyvinyl chloride plastic. The polyvinyl chloride, even after the conventional adding of fillers, plasticizers and extenders to lower the curing temperature, has a curing temperature above the temperature at which the synthetic fibers start to "melt" or break down.

The speed of the belt and the heat generated at the heaters at 22 are regulatable so that the heat at the plastic backing does not substantially exceed the curing temperature of the backing. The fiber material 14, on top of the layer of backing is protected thereby from the radiant heat. For this reason, the backing is cured and bonded firmly to the felt without injury to the synthetic fibers when it reaches the end of table 16.

At this point the felt and attached backing is led between two water cooled rolls 25 and 26 which are driven, by conventional means not shown, at the speed of belt 12 so that the felt with it backing is "peeled" or stripped from the belt 12. Conventional cutters, not shown, may be located adjacent the rolls 25 and 26 to trim the edges of the now-backed strip of felt 14 and the backed felt may be cut into sections of any length. The impervious nature of belt 12 provides a slick surface from which the backing is easily separated and the backing, having been cured, separates as a unit from the belt.

It will be apparent that the process of applying the backing and curing it is a continuous process and the only limitation to the length of backed textile produced is the length of the supply of textile material used.

While the synthetic fiber material has been described as a felt it will be apparent that the machine 10 and the coating method described above may be used for any textile which has a breakdown temperature near to that of the curing temperature of the material used for the backing.

As will be apparent to those familiar with the art, the invention may be embodied in other specific forms without departing from the spirit or essential characteristics thereof. The embodiment disclosed therefore is to be considered in all respects as illustrative, rather than restrictive, the scope of the invention being indicated by the appended claims.

What is claimed is:

1. An apparatus for coating a plastic backing on a synthetic fiber textile material, comprising: a continuously driven endless belt of translucent material, radiant heating means under the upper run of the belt for continuously heating material on the upper run of the belt, means above the starting end of the belt upper run for spreading the plastic backing in uncured liquid form on the belt, a continuous supply of fiber sheet material, a weighted roller forward of the spreading means under which the fiber material is led and is pressed thereby on to the uncured backing on the belt, and means at the end of the upper run for stripping the fiber material and backing from the belt after the backing has been cured by passing along above the heating means.

2. An apparatus for coating a plastic backing on a synthetic felt material comprising: a table having a top of translucent material, rollers at each end of the table, at least one of the rollers being driven, an endless belt of flexible translucent material positively supported and driven by the rollers, the top run of the belt being supported by the table top, a supply roll of felt material, means rotatably supporting the felt roll above the table, conduit means extending across one end of the table for spreading uncured plastic in liquid form on the endless belt, doctor blade means forward of the conduit means for spreading and regulating the thickness of the uncured plastic, at least one weighted roller forward of the blade means, the felt being led from a supply roll under said weighted roller for compressing the felt down on the liquid plastic on the belt, radiant heater means under the table forward of the weighted roller for heating the spread plastic on the belt to a plastic-curing temperature, and a pair of driven cooled rollers forward of the table for drawing therebetween the felt with cured plastic backing and stripping it off of the belt.

3. The apparatus as defined by claim 1 having means to regulate the radiant heated means and belt speed to bring the plastic on the belt to a temperature not substantially higher than the curing temperature of the plastic.

References Cited

UNITED STATES PATENTS

| | | | |
|---|---|---|---|
| 3,082,138 | 3/1963 | Hjelt | 156—380 X |
| 3,243,330 | 3/1966 | Zelnick | 156—380 |
| 3,247,041 | 4/1966 | Henderson | 156—272 |
| 3,330,716 | 7/1967 | Zelnick | 156—380 |
| 3,347,729 | 10/1967 | Seefluth | 156—380 |

CARL D. QUARFORTH, Primary Examiner

S. J. LECHERT, Jr., Assistant Examiner

U.S. Cl. X.R.

156—246, 247, 272, 344, 498, 500, 522, 543, 584